United States Patent
Nishida et al.

(10) Patent No.: US 8,810,764 B2
(45) Date of Patent: Aug. 19, 2014

(54) LATERAL-ELECTRIC-FIELD MODE LIQUID CRYSTAL DISPLAY DEVICE

(75) Inventors: Shinichi Nishida, Kanagawa (JP); Takayuki Konno, Kanagawa (JP); Taku Kawasaki, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 175 days.

(21) Appl. No.: 13/009,237

(22) Filed: Jan. 19, 2011

(65) Prior Publication Data
US 2011/0176100 A1  Jul. 21, 2011

(30) Foreign Application Priority Data
Jan. 19, 2010  (JP) ................................. 2010-009379

(51) Int. Cl.
*G02F 1/1343*  (2006.01)
*G02F 1/1333*  (2006.01)
*G02F 1/1337*  (2006.01)

(52) U.S. Cl.
CPC ............ *G02F 1/134363* (2013.01); *G02F 2001/133738* (2013.01)
USPC ............... 349/141; 349/38; 349/54; 349/139; 349/147

(58) Field of Classification Search
CPC ................. G02F 1/134363; G02F 1/136213
USPC ................. 349/38, 54, 139, 141, 147
See application file for complete search history.

(56) References Cited

U.S. PATENT DOCUMENTS

| | | | |
|---|---|---|---|
| 5,905,556 A | 5/1999 | Suzuki et al. | |
| 6,281,958 B1 * | 8/2001 | Nakajima | 349/141 |
| 6,459,464 B1 * | 10/2002 | Nakasima et al. | 349/141 |
| 6,618,109 B2 | 9/2003 | Hidehira et al. | |
| 7,782,415 B2 | 8/2010 | Sasaki | |
| 2007/0252937 A1 * | 11/2007 | Suzuki et al. | 349/141 |

FOREIGN PATENT DOCUMENTS

| | | |
|---|---|---|
| CN | 101055361 | 10/2007 |
| CN | 101286516 | 10/2008 |
| JP | 10-307295 | 11/1998 |
| JP | 2002-323706 | 11/2002 |
| JP | 2010-026287 | 2/2010 |
| TW | 500948 | 9/2002 |
| TW | 554222 | 9/2003 |

OTHER PUBLICATIONS

CN Office Action dated Jan. 13, 2014, with English translation; Application No. 201110030219.2.

* cited by examiner

*Primary Examiner* — Lucy Chien
*Assistant Examiner* — Paisley L Arendt
(74) *Attorney, Agent, or Firm* — Young & Thompson

(57) ABSTRACT

To provide a structure for achieving high transmittance in a lateral-electric-field mode liquid crystal display device through stably controlling the domains in the terminal parts of comb-shaped electrodes where the liquid crystal molecules rotate in the reverse direction. In the lateral-electric-field mode liquid crystal display device in which common electrodes and pixel electrodes are formed on a same layer, a protrusion part is provided in a direction in an obtuse angle with the comb-shaped electrode and substantially in parallel to a scan line in the terminal part of the comb-shaped electrode of the pixel electrode or the common electrode, a floating electrode is extended in the extending direction of the comb-shaped electrode to overlap with the comb-shaped electrode in the terminal part, and a liquid crystal reverse rotation locked structure is formed with the protrusion part of the comb-shaped electrode and the floating electrode.

5 Claims, 21 Drawing Sheets

(RELATED ART)

(RELATED ART)

FIG. 20A
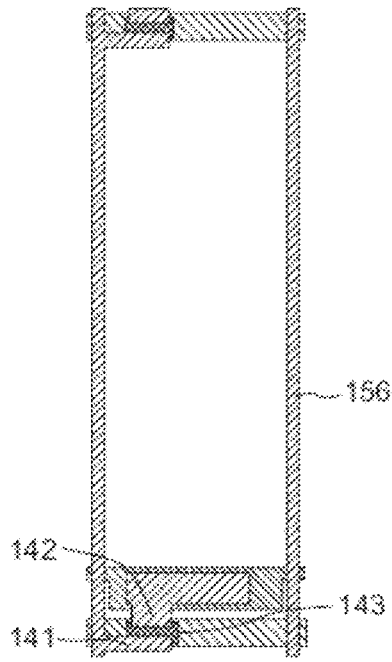
FIG. 20B
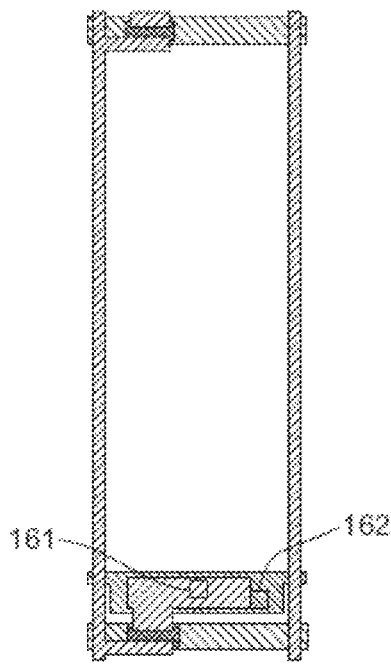
FIG. 20C
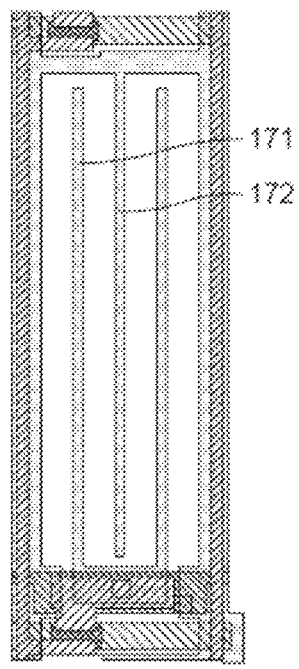
FIG. 20D
(RELATED ART)

(RELATED ART)

LATERAL-ELECTRIC-FIELD MODE LIQUID CRYSTAL DISPLAY DEVICE

CROSS-REFERENCE TO RELATED APPLICATION

This application is based upon and claims the benefit of priority from Japanese patent application No. 2010-009379, filed on Jan. 19, 2010, the disclosure of which is incorporated herein in its entirety by reference.

BACKGROUND OF THE INVENTION

1. Field of the Invention

The present invention relates to a liquid crystal display device and, more specifically, to a lateral-electric-field mode active matrix liquid crystal display device which can achieve a high numerical aperture ratio.

2. Description of the Related Art

In general, a liquid crystal display device (LCD) is characterized to be thin, light, and low power consumption. Particularly, an active matrix liquid crystal display device (AM-LCD) which drives individual pixels arranged in length and width directions in a matrix form by active elements is recognized as a high-definition flat panel display. Especially, a display device (TFT-LCD) using thin film transistors (TFTs) as the active elements for switching the individual pixels is being spread widely.

Many active matrix liquid crystal display devices use the electro-optical effect of twisted nematic (TN) liquid crystals, which displays images through displacing liquid crystal molecules by applying, to the liquid crystal sandwiched between two substrates, an electric field that is roughly vertical with respect to the substrate face. This is called a "vertical-electric-field mode". In the meantime, a "lateral-electric-field mode" liquid crystal display device which displays images through displacing liquid crystal molecules within a plane being roughly in parallel to the substrate face by applying an electric field that is roughly in parallel to the substrate face has been also well known from before. Various modifications are applied also on the lateral-electric-field mode liquid crystal display device as in the case of the vertical-electric-field mode liquid crystal display device, and an example thereof will be shown below.

Japanese Unexamined Patent Publication 2002-323706 (Patent Document 1) discloses a structure in which a pixel electrode and a common electrode (both formed in a comb shape) for generating a lateral electric field for driving liquid crystal are placed by sandwiching an insulating layer at a position higher (i.e., a position close to a liquid crystal layer) than a bus line (data line) which supplies a signal to an active element for driving each pixel (see claim 1, First embodiment, FIG. 1 and FIG. 2). With this structure, the electric field from the bus line can be blocked through forming the common electrode by covering the bus line, so that poor display caused due to vertical crosstalk can be prevented. Further, it is considered that the numerical aperture can be improved by forming the common electrode with a transparent conductive material.

FIGS. 19A-19C show an example of the structure of the typical lateral-electric-field mode active matrix liquid crystal display device. FIG. 19A is a plan view, FIG. 19B is a cross-sectional view taken along a line A-A' of FIG. 19A, and FIG. 19C is a cross-sectional taken along a line B-B' of FIG. 19A. Further, FIGS. 20A, 20B, 20C, and 20D are plan views of main parts showing manufacturing steps of the liquid crystal display device. All of those illustrations show regarding only one pixel region.

With the liquid crystal display device, as shown in FIG. 19A and FIG. 20B, each pixel region is formed in a rectangular range surrounded by a plurality of gate bus lines 155 extending in the lateral (left-and-right) direction of the drawings and a plurality of drain bus lines 156 extending in the vertical (top-and-bottom) direction of the drawings, and a plurality of pixels are arranged in a matrix form as a whole. A plurality of common bus lines 153 are formed by extending in the lateral direction of the drawings as in the case of the gate bus lines 155. A thin film transistor (TFT) 145 is formed at each intersection point between the gate bus lines 155 and the drain bus lines 156 by corresponding to each pixel. A drain electrode 141, a source electrode 142, and a semiconductor film 143 of the thin film transistor 145 are formed in respective patterns (shapes) shown in FIG. 20B.

Each of pixel electrodes 171 and common electrodes 172 for generating a liquid crystal driving electric field has comb-shaped parts (thin-strip sections projected within each pixel region) that are engaged with each other. There are two comb-shaped parts in the pixel electrode 171, and a single comb-shaped part in the common electrode 172 in this case. As shown in FIG. 19B, the pixel electrode 171 is electrically connected to the source electrode 142 of the thin film transistor 145 via a contact hole 161 opened through an organic interlayer film 160 and a protective insulating film 159. The common electrode 172 is electrically connected to the common bus line 153 via a contact hole 162 opened through the organic interlayer film 160, the protective insulating film 159, and an interlayer insulating film 157. A part of the source electrode 142 of the thin film transistor 145 overlaps with the common bus line 153 via the interlayer insulating film 157, and the overlapping part forms a storage capacitor for the pixel region.

The cross-sectional structure of the liquid crystal display device is as shown in FIG. 19B and FIG. 19C. An active matrix substrate and a counter substrate are joined and unified by having a liquid crystal 120 interposed there between.

The active matrix substrate includes a transparent glass substrate 111, and the common bus line 153, the gate bus line 155, the drain bus lines 156, the thin film transistor 145, the pixel electrode 171, and the common electrode 172 formed on the inner surface of the glass substrate 111. The common bus line 153 and the gate bus line 155 are formed directly on the inner surface of the glass substrate 111, and those are covered by the interlayer insulating film 157. The drain electrode 141, the source electrode 142, and the semiconductor film 143 of the thin film transistor 145 as well as the drain bus lines 156 are formed on the interlayer insulating film 157. Therefore, the common bus line 153 and the gate bus line 155 are electrically insulated from the drain electrode 141, the source electrode 142, the semiconductor film 143, and the drain bus lines 156 by the interlayer insulating film 157. Those structures formed on the glass substrate 111 are covered by the protective insulating film 159 except the contact holes 161 and 162. The steps generated because of the contact holes 161 and 162 are flattened by the organic interlayer film 160 formed on the protective insulating film 159. The pixel electrodes 171 and the common electrodes 172 are formed on the organic interlayer film 160. As described above, the pixel electrode 171 is electrically connected to the source electrode 142 via the contact hole 161, and the common electrode 172 is electrically connected to the common bus line 153 via the contact hole 162. The cross-sectional views of FIG. 19B and FIG. 19C are model illustrations, and those are not faithful regenerations of the actual step structure. The surface (the face on which the pixel electrodes 171 and the common electrodes 172 are formed) of the active matrix substrate having the above-described structures is covered by an alignment film 131 that is formed with an organic polymer film. Alignment processing for directing the initial direction of liquid crystal molecules 121 towards a prescribed direction (see an arrow in FIG. 19A) is applied on the surface of the alignment film 131. In the meantime, the counter substrate (a color filter substrate) includes a transparent glass substrate 112, a color filter (not shown) configured with three primary colors of red (R), green (G), and blue (B) formed on the inner surface of the glass substrate 112 by corresponding to each pixel region, and a light-shielding black matrix (not shown) formed in the regions other than those corresponding to each of the pixel regions. The color filter and the black matrix are covered by an acryl-based overcoat film (not shown). A columnar spacer (not shown) for controlling the space between the active matrix substrate and the counter substrate is formed on the inner surface of the overcoat film. Further, the inner surface of the overcoat film is covered by an alignment film 132 that is formed with an organic polymer. Alignment processing for directing the initial direction of liquid crystal molecules 121 towards a prescribed direction (see an arrow in FIG. 19A) is applied on the surface of the alignment film 132.

The active matrix substrate and the counter substrate having the structures described above are superimposed on one another with a prescribed space by being opposed to each other while having the surfaces where the alignment film 131 and the alignment film 132 are formed faced towards the inner side, respectively. The liquid crystal 120 is provided in the space between the both substrates, and the peripheral edges of the both substrates are sealed by a seal material (not shown) for sealing the liquid crystal 120 therein. A pair of polarization plates (not shown) is disposed on the outer side faces of the both substrates, respectively.

As described above, the alignment processing is uniformly applied on the surfaces of the alignment film 131 and the alignment film 132 so that the liquid crystal molecules 121 are aligned in parallel along the alignment direction when there is no electric field being applied. The alignment direction is defined as a direction that is tilted by 15 degrees clockwise with respect to the direction (the top-and-bottom direction of FIG. 19A) along which the comb-shaped parts of the pixel electrodes 171 and the common electrodes 172 are extended.

The directions of the transmission axes of the pair of polarization plates are set to be orthogonal to each other. One of the transmission axes of the pair of polarization plates is set to be consistent with the original alignment direction (the alignment direction when no electric field is applied) of the liquid crystal on which the alignment processing is applied uniformly.

Next, the manufacturing steps of the liquid crystal display device shown in FIG. 19 will be described by referring to FIG. 20.

The active matrix substrate is manufactured in a following manner. First, a chrome (Cr) film is formed on one surface of the glass substrate 111, and it is patterned to form the common bus line 153 and the gate bus line 155 having the shapes as shown in FIG. 20A. Thereafter, the interlayer insulating film 157 made of silicon nitride (SiNx) is formed all over the glass substrate 111 to cover the common bus line 153 and the gate bus line 155. Subsequently, the semiconductor film 143 (normally an amorphous silicon (a-Si) film) of the thin film transistor in an island pattern is formed in the interlayer insulating film 157 to overlap with the corresponding gate bus line 155 via the interlayer insulating film 157. Further, the drain bus line 156, the drain electrode 141, and the source electrode 142 are formed by forming a Cr film on the interlayer insulating film 157 and then patterning it (see FIG. 20B). Thereafter, the protective insulating film 159 made of SiNx and the organic interlayer film 160 made of a photosensitive acryl resin are formed in a stacked manner in this order on the interlayer insulating film 157 to cover the above-described structures. Subsequently, the square contact hole 161 opened through the protective insulating film 159 and the organic interlayer film 160 and the rectangular contact hole 162 opened through the interlayer insulating film 157, the protective insulating film 159, and the organic interlayer film 160 are formed (see FIG. 20C). Further, the pixel electrode 171 and the common electrode 172 are formed on the organic interlayer film 160 by forming an ITO (Indium Tin Oxide) film as a transparent electrode material on the organic interlayer film 60 and then patterning it. The pixel electrode 171 is in contact with the source electrode 142 via the contact hole 161. The common electrode 172 is in contact with the common bus line 153 via the contact hole 162 (see FIG. 20D and FIG. 19B). Thereby, the active matrix substrate can be fabricated.

The counter substrate (the color filter substrate) is manufactured in a following manner. First, the color filter and the light-shielding black matrix (both are not shown) are formed on one surface of the glass substrate 112. Thereafter, an overcoat film (not shown) is formed all over the glass substrate 112 to cover the color filter and the black matrix. Further, the columnar spacer (not shown) is formed on the overcoat film. Thereby, the counter substrate is fabricated. The alignment films 131 and 132 made of polyimide are formed, respectively, on the surfaces of the active matrix substrate and the counter substrate manufactured in the above-described manner. Thereafter, the alignment processing is done uniformly on the surfaces of the alignment films 131 and 132. Subsequently, after stacking the both substrates with each other with a prescribed space (4.5 µm, for example) therebetween, the peripheral edges of the both substrates are sealed by a seal material except the hole for injecting the liquid crystal. Then, after injecting prescribed nematic liquid crystal (nematic liquid crystal with refractive anisotropy of 0.067, for example) into the space between the both substrates from the hole for injecting the liquid crystal within a vacuum chamber, the hole for injecting the liquid crystal is closed. When the respective polarization plates (not shown) are laminated on the external surface of the both substrates after connecting and unifying the both substrates, the liquid crystal display device having the structures shown in FIG. 19 can be completed.

It is known that a region (called a "reverse rotation domain") where the liquid crystal molecules rotate in the direction that is reversed from the normal rotating direction of the liquid crystal molecule at the time of applying a liquid crystal driving electric field is generated in the vicinity of the tip section of the comb-shaped part of the pixel electrode 171 and the common electrode 172 in the lateral-electric-field mode liquid crystal display device described above.

FIG. 21 is an illustration for schematically describing the principle of generating the reverse rotation domain in the liquid crystal display device shown in FIG. 19 to FIG. 20. For simplifying the explanation, FIG. 21 shows only the pixel electrodes 171, the common electrode 172, and the liquid crystal molecules 121, and liquid crystal electric fields (electric power lines) E generated within the pixel regions by the comb-shaped parts of the electrode 171 and 172 are illustrated schematically.

The direction of the rotation (this rotation occurs within a plane that is almost in parallel to the active matrix substrate and the counter substrate) of the liquid crystal molecules 121 generated by the liquid crystal driving electric fields E is defined by the relation between the initial alignment direction (the alignment processing direction shown by an arrow) of the liquid crystal molecules 121 and the direction of the liquid crystal driving electric fields E. Thus, it is in the "clockwise direction" in most of the areas in the pixel regions. B shows a border domain showing the border at which the liquid crystal driving electric fields E change.

However, the liquid crystal driving electric fields E become radial as shown in FIG. 21 in the vicinity of the tip sections of the comb-shaped parts of the pixel electrodes 171, so that the liquid crystal molecules rotate in the "counterclockwise" direction in the region (reverse rotation domains R) shown in the drawing. That is, the regions shown in the drawing are the regions (i.e., the reverse rotation domains R) where the liquid crystal molecules rotate in the "counterclockwise" direction.

Japanese Unexamined Patent Publication Hei 10-307295 (Patent Document 2) discloses a technique which reduces coloring in the display from an oblique viewing angle through bending electrodes that generate lateral electric fields to intentionally vary the liquid crystal driving (rotating) directions by each region with the bent parts when the electric field is applied (see claims 1, 3, 5 and FIGS. 1-2, 4, and 6).

For example, it is assumed to be in a structure in which the initial alignment direction of the liquid crystal molecules of a first sub-region and the initial alignment direction of the liquid crystal molecules in a second sub-region are the same, and the liquid crystal molecules in each sub-region rotate in the reversed rotating directions when a voltage is applied while keeping the alignment directions to be in a mutually symmetrical relation (see claim 3). Further, in this structure, it is preferable that the lateral electric fields for driving the liquid crystal molecules are generated by parallel electrode pairs and that the electrodes configuring the parallel electrode pairs are bent in a V-shape (see claim 5).

As described above, the liquid crystal driving electric fields E are distributed radially in the vicinity of the tip sections of the comb-shaped electrodes, thereby forming the regions (reverse rotation domains) where the liquid crystal molecules rotate in the direction opposite from the prescribed rotating direction due to the relation with respect to the initial alignment direction of the liquid crystal. Since the liquid crystal driving electric fields E are in a gradual radial form in the vicinity of the tip sections of the comb-shaped electrodes, dark regions (the border domains B) generated between the reverse rotation domains R and the normal domains become large and the positions of the border domains B are unstable as well.

Therefore, when there is an external pressure such as finger pressing or the like applied on the display surface, the shapes of the reverse rotation domains R (or the positions of the border domains B) become unstable. Therefore, it is recognized as a finger pressed mark even after the external pressure is released. Further, there is also an issue of generating panel transmittance loss since the width of the border domains B becomes widened. That is, while the reverse rotation domains R contribute to the panel transmittance, the border domains B remain in a dark state even at the time of white display (at the time of applying voltage).

It is therefore an exemplary object of the present invention to provide a structure which can achieve a high transmittance in a lateral-electric-field mode liquid crystal display device through stably controlling the domains generated in the terminal parts of the comb-shaped electrodes where the liquid crystal molecules rotate in the reverse direction.

SUMMARY OF THE INVENTION

In order to overcome the foregoing issues, the liquid crystal display device according to an exemplary aspect of the invention is a lateral-electric-field mode liquid crystal display device which enables display by rotating homogeneously aligned liquid crystal by a lateral electric field that is substantially in parallel to a substrate applied between pixel electrodes and common electrodes, wherein: the pixel electrodes and the common electrodes are formed on a same layer, and the pixel electrodes and the common electrodes have comb-shaped first parts extended alternately substantially in parallel to each other; there is at least one region in a terminal part of the first part of either the pixel electrode or the common electrode, which is surrounded on three sides by two of the first parts of the other electrode out of the pixel electrode and the common electrode and a second part that connects the two first parts; and at least in the one region, there is a protrusion part connected to the terminal part of the first part, the protrusion part being extended in a direction rotated by an angle in a range of 90 degrees, inclusive, to 180 degrees, exclusive, by having the terminal part of the first part as the rotation center, towards a direction, by an acute angle rotation towards which direction, the extending direction of the first part can be overlapped with an alignment direction of the liquid crystal, and there is also a floating electrode that overlaps with the terminal part of the first part via an insulating film, the floating electrode being extended in a direction that is roughly the same direction as the extending direction of the first part up to a position closer to the second part of the other electrode than the terminal part of the first part.

FIG. 3 shows the effects thereof. The floating electrode has a substantially equal potential as the comb-shaped parts of the electrodes having the tip sections in the parts. The reverse rotation domains can be locked in by the region surrounded by the protrusion parts of the comb-shaped electrodes, the floating electrodes, and the electrodes opposing to the comb-shaped parts of the electrodes having the tip sections in the parts (hereinafter, the locked-in region is called a reverse rotation locked region).

As an exemplary advantage according to the invention, this makes it possible to completely suppress the issues of such phenomena caused with the related techniques that the dark regions (border domains) generated between the reverse rotation domains and the normal domains become expanded and the positions thereof become unstable. Therefore, it is possible to acquire a structure with which no finger pressed mark or the like remains after an external pressure is released even when the external pressure such as finger pressing or the like is applied on the display surface, since the reverse rotation locked region is stable.

Further, the floating electrode can be extended to the area extremely close to the opposing electrode or to an area slightly overlapping with the counter electrode. Thus, a sufficiently strong lateral electric field can be generated up to the area of the opposing electrode, so that the light utilization efficiency can be increased. Further, the transmittance light can be actively utilized even in the reverse rotation locked region formed between the floating electrode and the protrusion part of the comb-shaped electrode, so that the light utilization efficiency can be improved as well.

Further, in the liquid crystal display device of the present invention, the first parts of the pixel electrode and the common electrode are in a bent structure, including a part tilted by a specific angle θ with respect to the alignment direction of the liquid crystal and a part tilted by −θ. The second part of the pixel electrode or the common electrode can be formed substantially perpendicular to the liquid crystal alignment direction.

With this, a still wider viewing angle can be acquired.

Further, as a desirable form of the liquid crystal display device of the present invention, the bent direction of the first part in the terminal part of the first part can be set to be substantially in parallel to the second part of the other electrode.

This makes it possible to lock in the reverse rotation regions efficiently and to widen the regions of the forward direction.

The present invention is capable of efficiently locking in the regions where the liquid crystal molecules rotate in the reverse direction in the vicinity of the end of the electrode with the floating electrode extended substantially in the same direction as that of the comb-shaped electrode and the protrusion part provided in the end of the comb-shaped electrode, and capable of bringing the floating electrode to the vicinity of the opposing electrode. Therefore, a normal-state lateral electric field can be applied in almost all the regions on the outside of the liquid crystal reverse rotation region. Further, the liquid crystal reverse rotation region can be closed in to a still smaller region, so that the light utilization efficiency can be increased prominently.

The present invention makes it possible to achieve extremely high light utilization efficiency in IPS (In Plane Switching) liquid crystal display devices.

BRIEF DESCRIPTION OF THE DRAWINGS

FIGS. 19A-19C show illustrations of an example of the structure of a typical lateral-electric-field mode active matrix liquid crystal display device, in which FIG. 19A is a plan view of a pixel, FIG. 19B is a cross-sectional view taken along a line A-A' of FIG. 19A, and FIG. 19C is a cross-sectional view taken along a line B-B' of FIG. 19A;

FIG. 20 is a main part plan view showing manufacturing steps of the liquid crystal display device shown in FIG. 19.

DETAILED DESCRIPTION OF THE PREFERRED EMBODIMENTS

Figure 4:
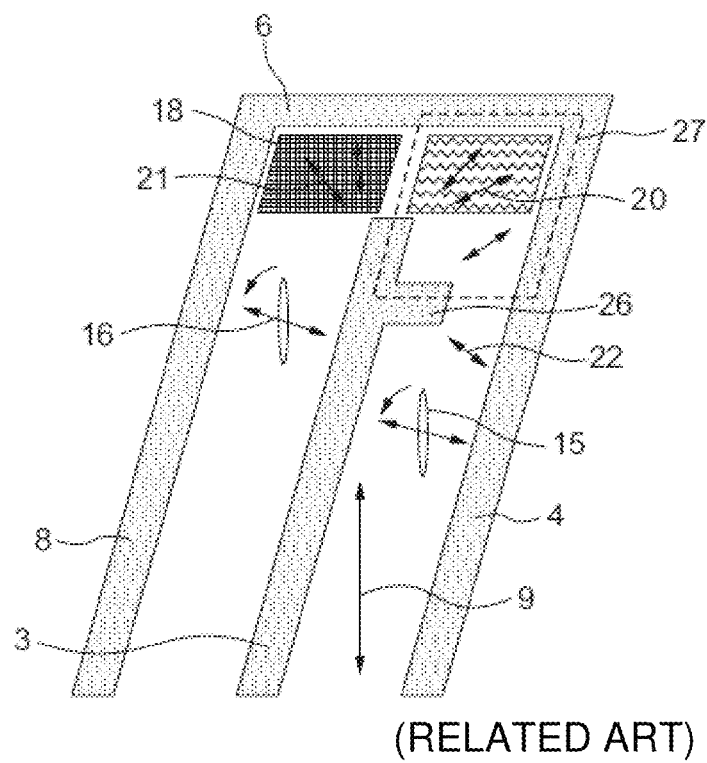
FIG. 4 is an illustration for describing Japanese Patent Application 2008-188243.

Japanese Patent Application 2008-188243 proposes a technique which divides a tip of a comb-shaped electrode of IPS into two branches, and locks in the area where the liquid crystal molecules rotate in the direction different from a prescribed direction in the divided electrodes. FIG. 4 shows the main idea of this case. The tip of the comb-shaped electrode part (a first part 3) of the pixel electrode is divided into two branches, and a protrusion part 26 is provided in the direction different from the extending direction of the comb tooth. Between the protrusion part 26 and the comb-shaped electrode part (a first part 4) of the common electrode, an electric field 22 of the so-called forward direction works in the lower-side region of the protrusion part 26 for causing rotating actions in the direction (referred to as the forward direction hereinafter) which is the same direction towards which liquid crystal molecules 15 are rotated by an electric field 16 applied between the first part 3 of the pixel electrode and the first part 4 of the common electrode.

In the meantime, an electric field 20 for rotating the liquid crystal in the direction reversed from the forward direction works in a region 27 surrounded by the two-branch part of the tip of the pixel electrode, the first part 4 of the common electrode, and a second part 6 connecting the comb-shaped electrode of the common electrode. Through a reverse-direction electric field working between the protrusion part 26 of the pixel electrode and the first part 4 of the common electrode, the liquid crystal molecules 15 of the entire region 27 can be rotated stably in the reverse direction. Further, the liquid crystal molecules 15 can be rotated in the forward direction in the regions on the outside of the region 27. This makes it possible to control the liquid crystal efficiently in the tip section of the comb-shaped electrode, so that the light utilization efficiency can be increased.

The related technique disclosed in Japanese Patent Application 2008-188243 can lock in the reverse rotation region with the two branched parts and use it actively. However, when the part extending substantially in parallel with the comb-shaped electrode out of the two branched parts is in the same layer as that of the opposing electrode (the common electrode in the drawing), those cannot be placed too close in terms of the process control. Under a normal LCD design rule, it is necessary to have a distance of about 5 μm (or about 2 μm even in a highly controlled process), the reverse rotation locked region 27 becomes larger for that amount. Further, even though the forward-direction electric field works, the distance between the comb-shaped electrode tip section and the opposing electrode becomes isolated, thereby forming a region 18 where the electric field is not applied sufficiently. Due to these factors, the light utilization efficiency becomes deteriorated.

The present invention is characterized as a lateral-electric-field mode liquid crystal display device which enables display by rotating homogeneously aligned liquid crystal by a lateral electric field that is substantially in parallel to a substrate applied between pixel electrodes and common electrodes, wherein: the pixel electrodes and the common electrodes are formed on a same layer, and the pixel electrodes and the common electrodes have comb-shaped first parts extended alternately substantially in parallel to each other; there is at least one region in a terminal end part of the first part of either the pixel electrode or the common electrode, which is surrounded on three sides by two of the first parts of the other electrode out of the pixel electrode and the common electrode and a second part that connects the two first parts; and at least in the one region, there is a protrusion part connected to the terminal part of the first part, the protrusion part being extended in a direction rotated by an angle in a range of 90 degrees, inclusive, to 180 degrees, exclusive, by having the terminal part of the first part as the rotation center, towards a direction, by an acute angle rotation towards which direction, the extending direction of the first part can be overlapped with an alignment direction of the liquid crystal, and there is also a floating electrode that overlaps with the terminal part of the first part via an insulating film, the floating electrode being extended in a direction that is roughly the same direction as the extending direction of the first part up to a position closer to the second part of the other electrode than the terminal part of the first part.

The details thereof will be described hereinafter along a specific exemplary embodiment.

First Exemplary Embodiment

A first exemplary embodiment will be described by referring to FIGS. 1A, 1B, FIG. 2, and FIG. 3.

Figure 1A:
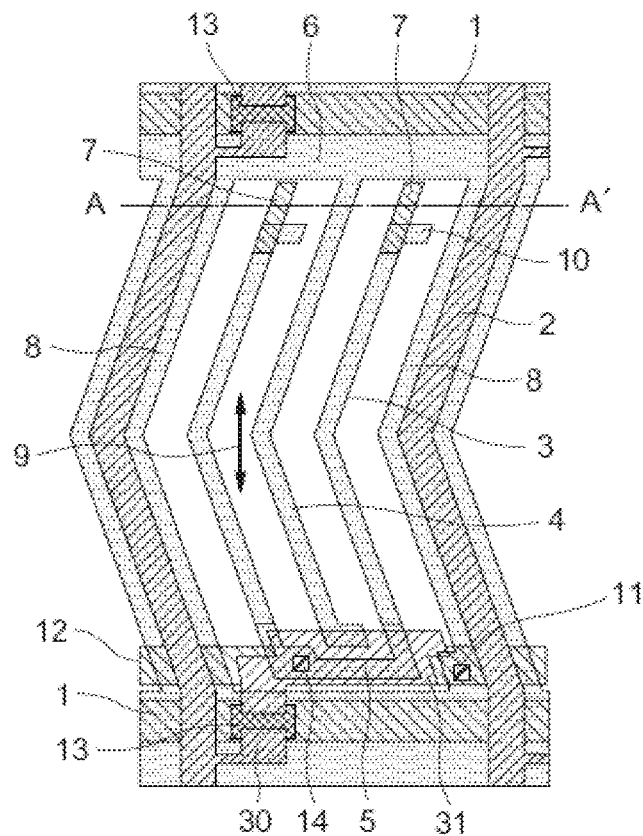
FIG. 1A is a plan view showing the structure of a pixel of a liquid crystal display device according to a first exemplary embodiment of the present invention.
Figure 1B:
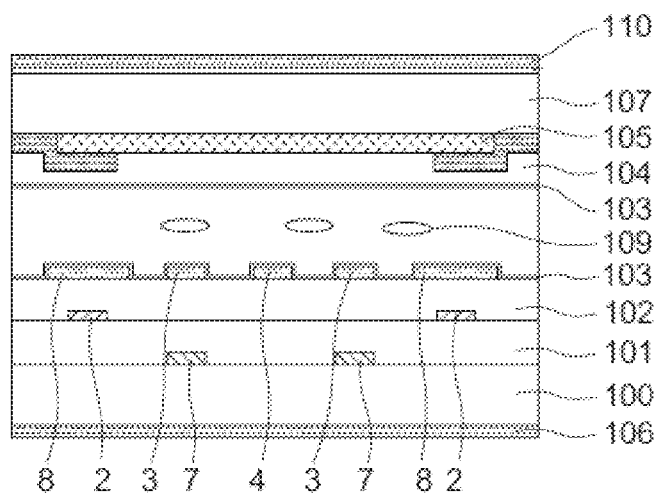
FIG. 1B is a cross-sectional view taken along a line A-A' of FIG. 1A.
Figure 2:
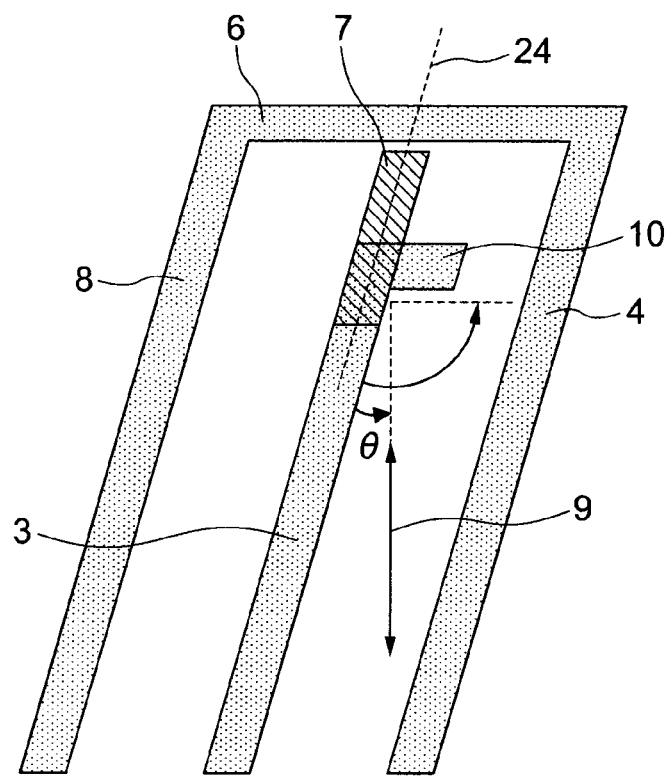
FIG. 2 shows a main part concentrating on the tip section of a pixel electrode shown in FIG. 1 which shows the plan view of the liquid crystal display device according to the first exemplary embodiment of the present invention.
Figure 3:
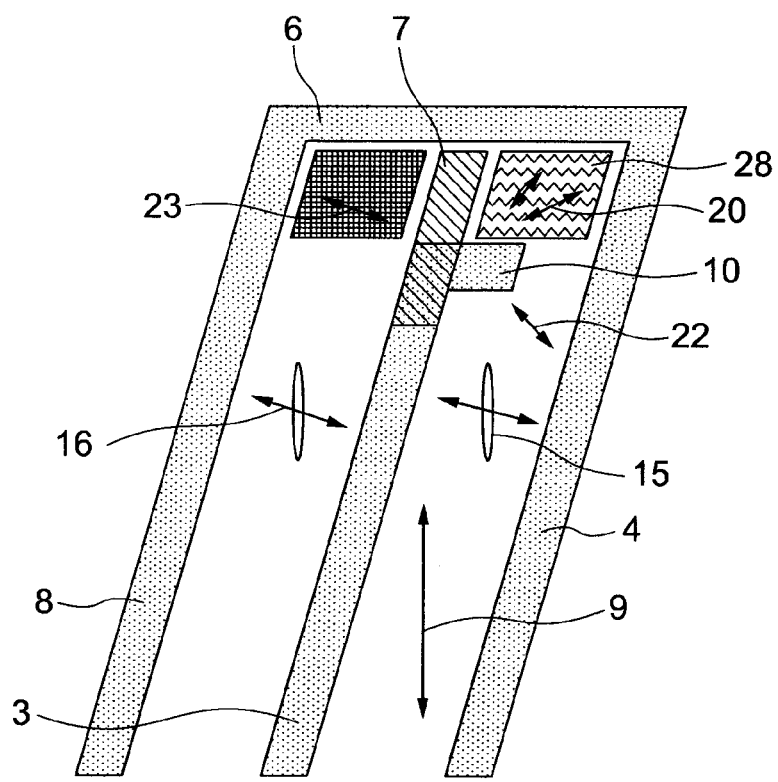
FIG. 3 is an illustration for describing behaviors of the liquid crystal shown in FIG. 2 which shows the main part in the plan view of the liquid crystal display device according to the first exemplary embodiment of the present invention.

FIG. 1A is a plan view showing the structure of a pixel of a liquid crystal display device according to the first exemplary embodiment of the present invention. FIG. 1B is a cross-sectional view taken along a line A-A' of FIG. 1A. FIG. 2 is an enlarged view of the part in the vicinity of the upper end part of a comb-shaped electrode (the first part 3 of the pixel electrode) of the pixel of FIG. 1. FIG. 3 is an illustration for describing behaviors of the liquid crystal shown in FIG. 2.

Hereinafter, the pixel of the first exemplary embodiment shown in FIGS. 1A and 1B will be described in details by following its fabrication order.

First, a scan line 1, a common signal wiring 12, and a reverse rotation locking floating electrode 7 are formed on a glass substrate 100 by a first metal layer (e.g., Cr of 250 nm). Then, a gate insulating film 101 (e.g., SiNx of 500 nm) and a thin film semiconductor layer 13 (e.g., 200 nm/50 nm of a-Si/n-a-Si) are formed, and the thin film semiconductor layer 13 is patterned by leaving only a TFT part that is provided as a switching element of the pixel. Further, by using a second metal layer (e.g., 250 nm of Cr), a data line 2, a source/drain electrode 30 of the TFT, and a pixel electrode part 31 made with the second metal layer are formed. Then, n-a-Si of the TFT part is eliminated by having the source/drain electrode 30 of the TFT as a mask.

Thereafter, a protective insulating film 102 (e.g., 600 nm of SiNx) is formed, and a through hole 14 for connecting the pixel electrode and a through hole 11 for connecting the common electrode are formed.

Further, a pattern configured with the first part 3 of the pixel electrode, a second part 5 of the pixel electrode, a first part 4 of the common electrode, a second part 6 of the common electrode, a first part 8 of the common electrode for shielding a data line 2, and a protrusion part 10 of the tip of the pixel electrode is formed thereon by using a transparent electrode (e.g., 80 nm of ITO). A TFT array is formed by a method described above.

A counter glass substrate 107 on which a color layer 105 of RGB and an overcoat layer 104 are formed as a color filter is prepared. A columnar spacer (not shown) is provided on the overcoat layer 104 of the color filter in such a manner that the thickness of the liquid crystal layer becomes 3.5 μm.

An alignment film 103 is applied and baked on both the TFT substrate on which the array is formed and the color filter substrate, and rubbing processing is performed on both substrates in the direction of liquid crystal initial alignment direction 9 of FIG. 1. The both substrates are laminated, and liquid crystal 109 is injected therein. As the liquid crystal 109, a liquid crystal material satisfying $\Delta n=0.086$ and $\Delta \epsilon=9$ is used, and it is homogeneously aligned in the liquid crystal initial alignment direction 9.

Further, two polarization plates 106 and 110 having one polarization axis directed towards the liquid crystal initial alignment direction 9 are laminated on the outer side of the glass substrate 100 and the counter glass substrate 107. Thereby, the liquid crystal panel can achieve fine black display in a state where a voltage is not applied to the liquid crystal 109.

Further, through applying a voltage between the first part 3 of the pixel electrode and the first part 4 of the common electrode by driving the scan line 1 and the data line 2, an electric field (lateral electric field) 16 that is substantially in parallel to the substrate can be applied. This makes it possible to control the display by rotating liquid crystal molecules 15 of the liquid crystal 109.

The first part 3 of the pixel electrode, the first part 4 of the common electrode, and the first part 8 of the common electrode that shields the data line 2 are in a form bent in the vicinity of the center of the pixel. The upper half part of the first part 3 of the pixel electrode is tilted by θ clockwise with respect to the liquid crystal initial alignment direction 9, and the lower half part is tilted by −θ. Thereby, an electric filed in the direction rotated by θ clockwise from the horizontal direction (the extending direction of the scan line 1) is applied in the upper half part of the pixel in the drawing between the first part 3 of the pixel electrode and the first part 4 of the common electrode, and an electric field in the direction rotated by −θ from the horizontal direction is applied in the lower half part of the pixel in the drawing. In the exemplary embodiment, it is set to be θ=15 degrees.

With such electric fields, the liquid crystal molecules 15 rotate in the reverse directions from each other in the upper part and the lower part of the pixel. Thus, the liquid crystal molecules can optically compensate each other, so that it is possible to achieve a wide viewing angle with no gradation inversion and no coloring.

The second part 6 of the common electrode connects the first part 4 of the common electrode with the first part 8 of the common electrode that shields the data line 2, and connects those to a common signal wiring 12 via the through hole 11. Further, the second part 6 of the common electrode is formed to cover the scan line 1 for shielding it. Thereby, no influence of the electric field from the scan line 1 is to be imposed, so that the effective display region of the pixel can be secured wide.

The first part 8 of the common electrode that shields the data line 2 shields the electric field of the data line 2 to suppress the influences thereof imposed on the display unit. At the same time, the first part 8 of the common electrode takes up a role that is equivalent to the first part 4 of the common electrode, i.e., has a function of applying a lateral electric field between the first part 3 of the pixel electrode and itself.

The main part regarding the first exemplary embodiment of the present invention will be described by referring to FIG. 2 and FIG. 3.

On the upper end part of the first part 3 of the pixel electrode, the protrusion part 10 is formed in the direction rotated at an angle in a range of 90 degrees, inclusive, to 180 degrees, exclusive, which is in a direction making an acute-angle rotation towards the liquid crystal initial alignment direction 9 from an extending direction 24 of the first part 3 of the pixel electrode by having the end part as the start point (i.e., the direction with which the direction towards the base part from the end part of the first part 3 (the oblique lower left direction of the drawing) overlaps with the liquid crystal initial alignment direction 9 by making an acute-angle rotation. In this case, the protrusion part 10 is extended in the same direction as the horizontal direction (the extending direction of the scan line 1), i.e., extended in the direction of θ+90 degrees as the rotation angle from the first part 3 of the pixel electrode, in order to acquire the highest light utilization efficiency.

The protrusion part 10 of the tip of the pixel electrode is desirable to be formed close to the first part 4 of the common electrode as much as possible. In this exemplary embodiment, the space between the first part 3 of the pixel electrode and the first part 4 of the common electrode in the horizontal direction is set as 10 μm. It is necessary to isolate the pixel electrode and the common electrode by about 6 μm due to the restriction in terms of the manufacturing process such as exposure. Therefore, the protrusion part 10 in this case is extended for 4 μm from the tip of the first part of the pixel electrode.

It is empirically known that the length for extending the protrusion part 10 is to be at least 2 μm or more, and more desirably, 4 μm or more. Thereby, a reverse-direction electric field 20 in the reverse rotation locked region 28 on the upper side of the protrusion part 10 in the drawing and a forward-direction electric field 22 in the lower side region of the protrusion part 10 in the drawing can be formed sufficiently strong. Therefore, alignment of the liquid crystal can be stabilized.

Figure 5:
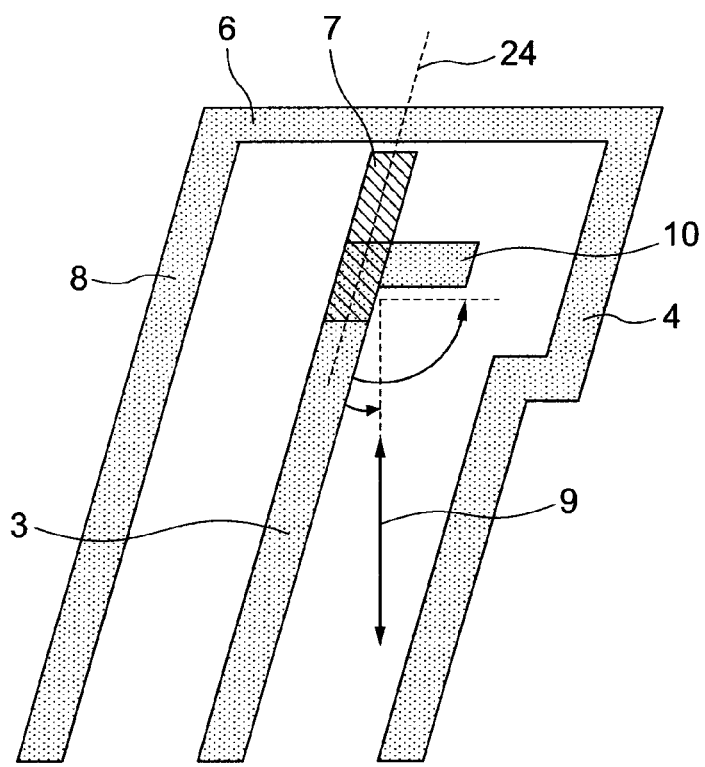
FIG. 5 is an illustration for describing a modification example of the first exemplary embodiment of the present invention.

In a case where the electrode space between the pixel electrode and the common electrode is narrow, the length of the protrusion part 10 can be secured by changing the shape of the first part 4 of the common electrode to a hook shape as shown in FIG. 5.

Further, the reverse rotation locking floating electrode 7 extended in the extending direction of the first part 3 of the pixel electrode is formed. The reverse rotation locking floating electrode 7 is formed by a first metal layer, and it is capacitance-coupled with the first part 3 of the pixel electrode via the gate insulating film 101 and the protective insulating film 102.

The reverse rotation locking floating electrode 7 can be brought to the position that is closer to the second part 6 of the common electrode than the terminal part of the first part 3 of the pixel electrode. It is desirable for this reverse rotation locking floating electrode 7 not to overlap with the second part 6 of the common electrode. Thereby, the reverse rotation locking floating electrode 7 has a main capacitance only with the pixel electrode, and only has a small capacitance with the common electrode since it does not overlap with the common electrode. Due to the relation regarding the capacitance coupling amounts, it comes to have an almost equivalent potential as that of the pixel electrode.

Thereby, in FIG. 3, the reverse rotation locking floating electrode 7 and the protrusion part 10 of the tip of the pixel electrode come to have the potential of the pixel electrode. The region surrounded by the first part 4 and the second part 6 of the common electrode opposing to that region is the electric field 20 for rotating the liquid crystal molecules 15 of the liquid crystal 109 in the clockwise direction in the drawing, and this domain can be taken as a reverse rotation locked region 28.

In the meantime, the region corresponding to the lower side of the protrusion part 10 in the drawing on the outside of the border of the reverse rotation locked region 28, the strong electric field 22 works between the protrusion part 10 and the first part 4 of the common electrode. The rotating direction (called a forward direction; counterclockwise direction in this drawing) caused in the liquid crystal molecules 15 of the liquid crystal 109 by a desirable electric field 16 between the first part (the comb-shaped electrode part) 3 of the pixel electrode and the first part (the comb-shaped electrode part) 4 of the common electrode and the rotating direction of the liquid crystal molecules 15 of the liquid crystal 109 caused by the strong electric field 22 match with each other. Therefore, the liquid crystal molecules 15 can be rotated in the forward direction without disturbance in the region on the lower side of the protrusion part 10.

Further, in a part of corresponding to the left side of the drawing of the reverse rotation locking floating electrode 7, the electrode 7 is almost equivalent to the potential of the pixel electrode. Thus, an effective electric field 23 which rotates the liquid crystal molecules 15 in the forward direction can be applied between the first electrode part 8 of the common electrode that shields the data line 2 and the second part 6 of the common electrode efficiently up to the edge of the second part 6 of the common electrode.

The above-structures make it possible to cause almost ideal forward-direction rotations in the regions on the lower side and the left side of the reverse rotation locked region 28 in the drawing, so that the light utilization efficiency can be increased.

Figure 19A:
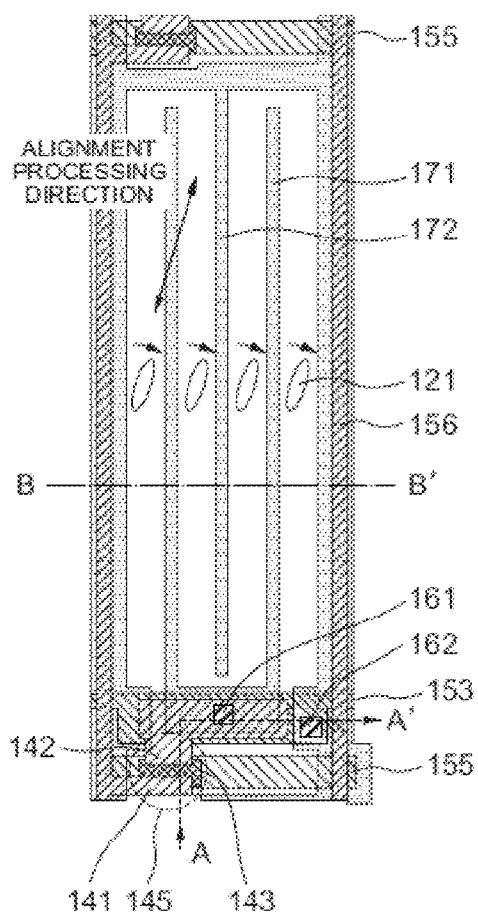
Figure 19B:
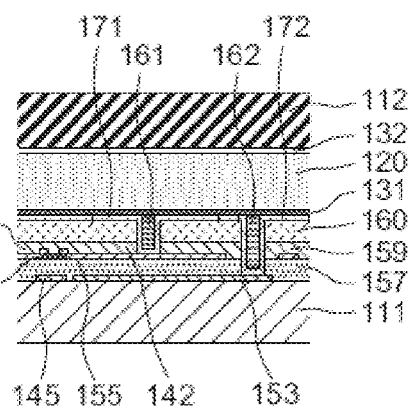
Figure 19C:
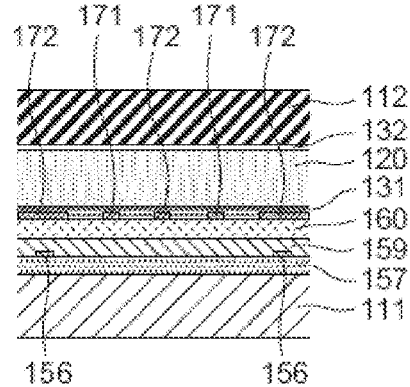
Figure 21:
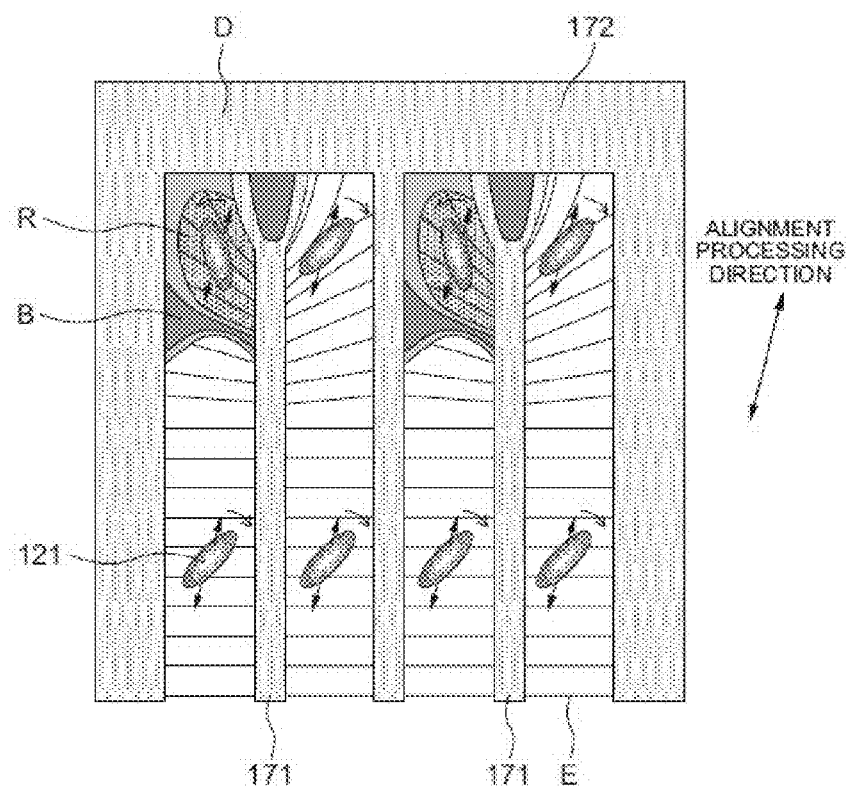
FIG. 21 is an illustration showing a state of an upper side of the pixel region of the liquid crystal display device shown in FIG. 19 when a liquid crystal driving electric field is applied by applying a voltage between pixel electrodes and common electrodes.

Further, it is verified that such phenomena caused with the structures shown in FIGS. 19-21 that a dark region (border domain) generated between the reverse rotation domain and the normal domain becomes large and that the position thereof becomes unstable can be suppressed completely. Thus, it is possible to acquire a structure with which no finger pressing mark or the like is generated at all after releasing an external pressure even when the external pressure such as finger pressing is applied on the display surface, since the reverse rotation locked region is stable.

Further, the pixel electrode and the common electrode are formed with a same layer. Thus, through forming both the first part 3 of the pixel electrode and the first part 4 of the common electrode with a transparent conductive film, the light passing on both electrodes can be utilized. Thus, there is an advantage in terms of the light utilization efficiency. Through forming the pixel electrode and the common electrode with the same layer, there is only one-time forming processing required for the transparent conductive layer. Therefore, the manufacturing steps can be simplified.

In the meantime, for forming the pixel electrode and the common electrode with the same layer, it is necessary to isolate the terminal part of the first part 3 of the pixel electrode from the second part 6 of the common electrode by a prescribed distance. In this exemplary embodiment, the both electrodes are formed with ITO while being isolated by 6 μm.

In this respect, with the technique proposed in Japanese Patent Application 2008-188243 shown in FIG. 4, the length (substantially equal to the space between the electrodes) to be extended substantially in parallel to the extending direction of the comb tooth of the electrode branched into two is required in addition to 6 μm. Thus, the two-branched diverging points are to be isolated from the connection part (the second part) of the common electrode by about 10-16 μm, so that the area of the reverse rotation locked region 27 becomes increased. This reverse rotation locked region 27 can utilize the light by utilizing the rotation of the liquid crystal molecules 15. However, the efficiency of applying the electric field is slightly less efficient compared to the lower side and left side of the region to which the forward-direction electric field is applied, so that the transmittance is deteriorated slightly.

Further, a region 18 formed on the upper left of the two-branched electrodes extending in the upper side of FIG. 4 is isolated from the terminal part of the electrode. Thus, the electric field 21 is weak, so that the liquid crystal molecules of the liquid crystal do not rotate sufficiently. Therefore, it is not possible to acquire large light transmittance.

In the meantime, in the case of the first exemplary embodiment to which the present invention is applied, the terminal part of the first part 3 of the pixel electrode simply needs to be isolated from the second part 6 of the common electrode by 6 μm. Thus, the reverse rotation locked region 28 can be made in a still smaller size. Therefore, the area of the normal domain on the lower side of the protrusion part 10 rotating in the forward direction can be secured still wider. Further, the reverse rotation locking floating electrode 7 that is of almost equivalent potential as that of the pixel electrode can be brought close to the position that is extremely close to the second part 6 of the common electrode. Therefore, the effective electric field 23 which rotates the liquid crystal molecules 15 in the forward direction can be applied between the first part 8 of the common electrode that shields the data line 2 and the second part 6 of the common electrode efficiently up to the edge of the second part 6 of the common electrode. Thus, unlike the case of Japanese Patent Application 2008-188243, there is no such region like the region 18 being generated. Therefore, the light utilization efficiency on the outside of the reverse rotation locked region can be increased.

Figure 6:
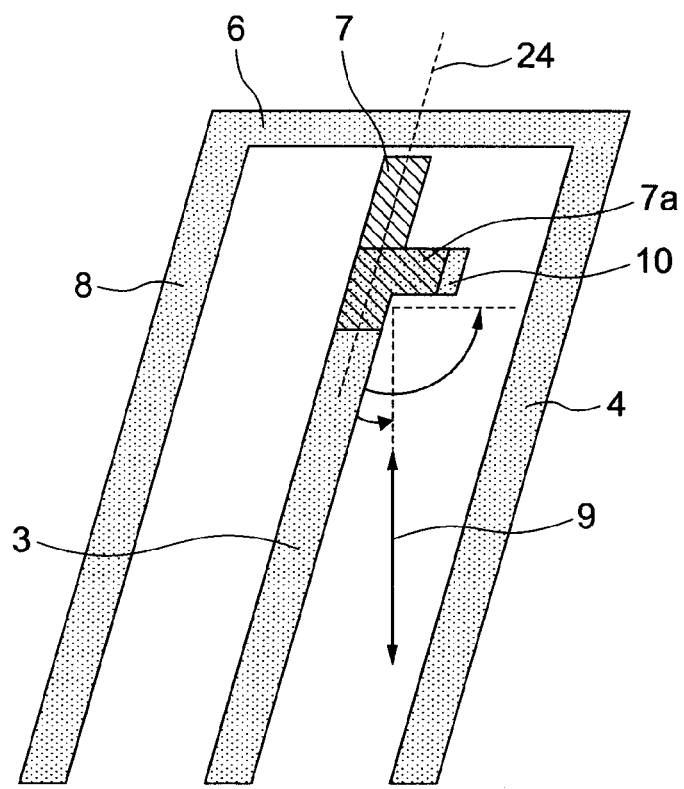
FIG. 6 is an illustration for describing a modification example of the first exemplary embodiment of the present invention.
Figure 7:
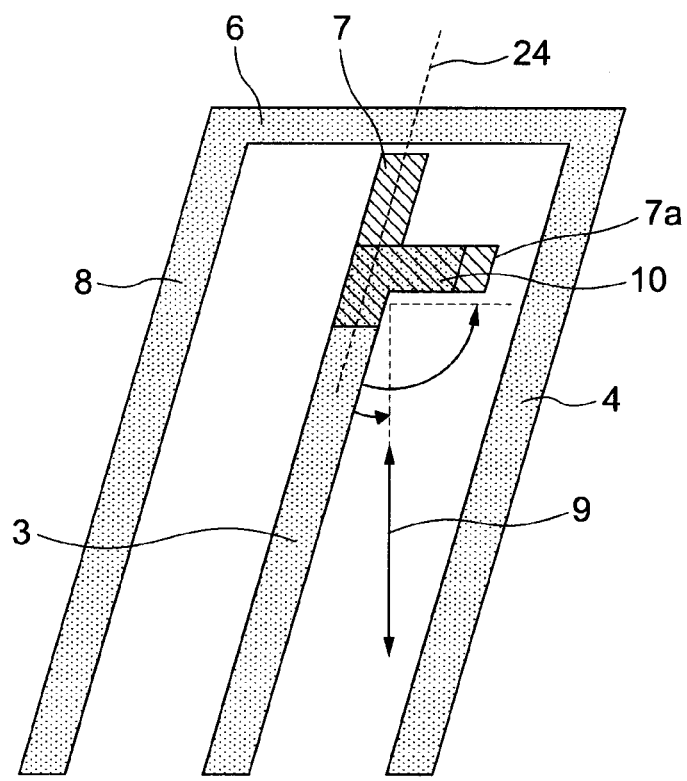
FIG. 7 is an illustration for describing a modification example of the first exemplary embodiment of the present invention.

Through the above, it is possible with the first exemplary embodiment to acquire the fine light utilization efficiency even better than the case of Japanese Patent Application 2008-188243. In the first exemplary embodiment, the reverse rotation locking floating electrode 7 is formed linearly by extending to the first part 3 of the pixel electrode. However, it is not essential to be in a linear form. As shown in FIG. 6, a protrusion part 7a may also be formed in the reverse rotation locking floating electrode 7 along the protrusion part 10 of the pixel electrode. Further, the protrusion 7a of the reverse rotation locking floating electrode 7 can be formed to be still closer to the first part 4 of the common electrode by going over the protrusion part 10 through extending it along the protrusion part 10 of the pixel electrode as shown in FIG. 7. In that case, the step of the reverse rotation locking floating electrode 7 formed with the first metal layer abuts against the rubbing direction perpendicularly, so that the alignment control becomes more difficult. However, there is such an advantage that the control of electric fields becomes stable.

Figure 8:
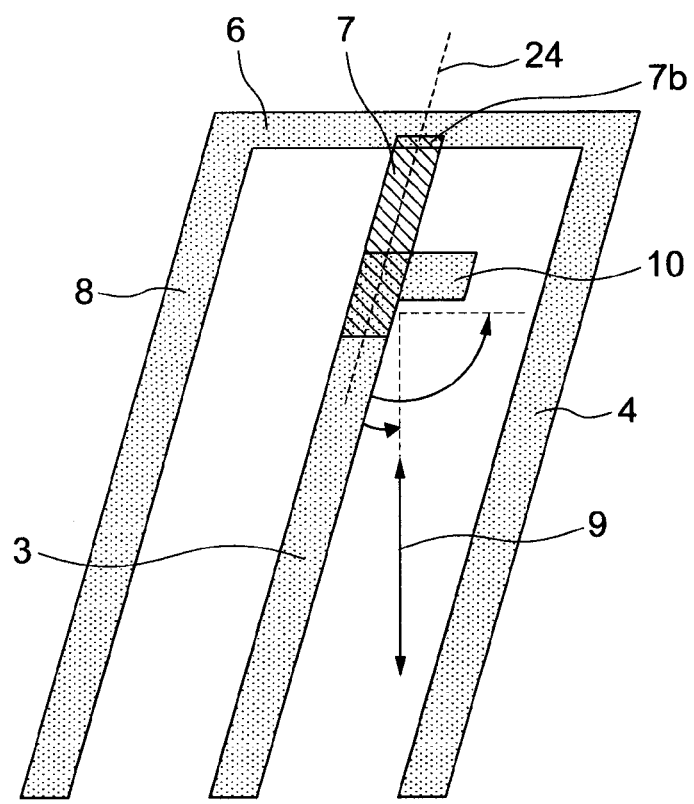
FIG. 8 is an illustration for describing a modification example of the first exemplary embodiment of the present invention.
Figure 9:
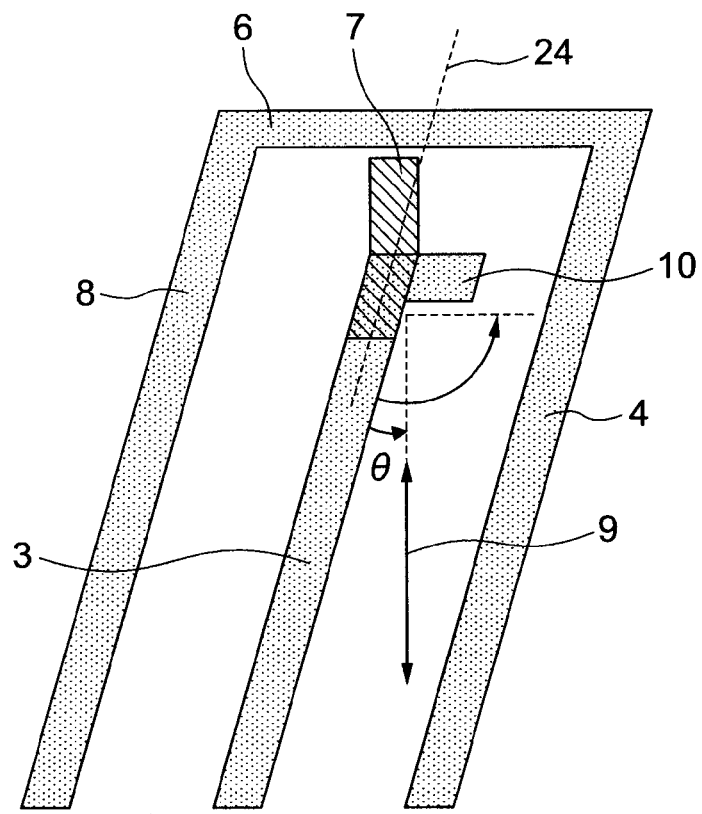
FIG. 9 is an illustration for describing a modification example of the first exemplary embodiment of the present invention.

Further, while the reverse rotation locking floating electrode 7 is formed not to overlap with the second part 6 of the common electrode in the first exemplary embodiment, it is also possible to employ a structure in which those are overlapping with each other slightly as in FIG. 8 by considering a margin regarding the divergence in alignment, etc. In that case, it is desirable for the overlapping area of the reverse rotation locking floating electrode 7 and the second part 6 of the common electrode to be sufficiently smaller compared to the overlapping area with the pixel electrode so that the reverse rotation locking floating electrode 7 becomes almost equivalent to the potential of the pixel electrode.

Further, while the reverse rotation locking floating electrode 7 is formed along the extending direction of the first part 3 of the pixel electrode linearly in the first exemplary embodiment, the reverse rotation locking floating electrode 7 may be bent at the end part or the extended part may be extended in the direction that is slightly different from the extending direction of the first part 3 of the pixel electrode. In that case, it is possible to form the reverse rotation locked region 28 stably, and to form the forward-direction rotating region on the outside thereof properly. However, the maximum light utilization efficiency is achieved when the reverse rotation locking floating electrode 7 is extended in the direction along the first part 3 of the pixel electrode. Even when it is formed by being deviated therefrom, it is desirable to be within $\pm 2\theta$ with respect to the angle $\theta$ that is formed between the liquid crystal initial alignment direction 9 and the extending direction of the first part 3 of the pixel electrode. Thereby, the reverse rotation locked region 28 can be locked in stably.

Figure 10:
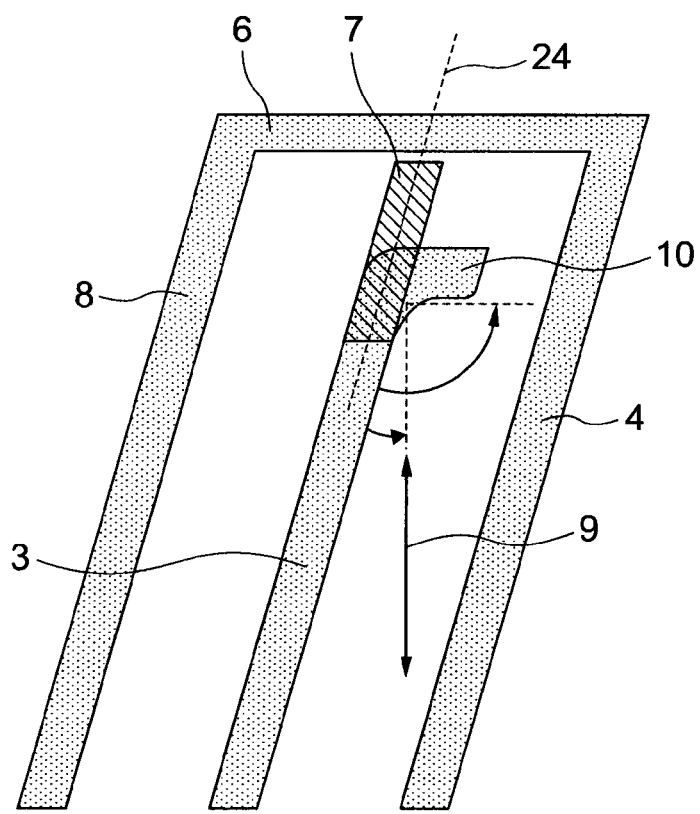
FIG. 10 is an illustration for describing a modification example of the first exemplary embodiment of the present invention.
Figure 11:
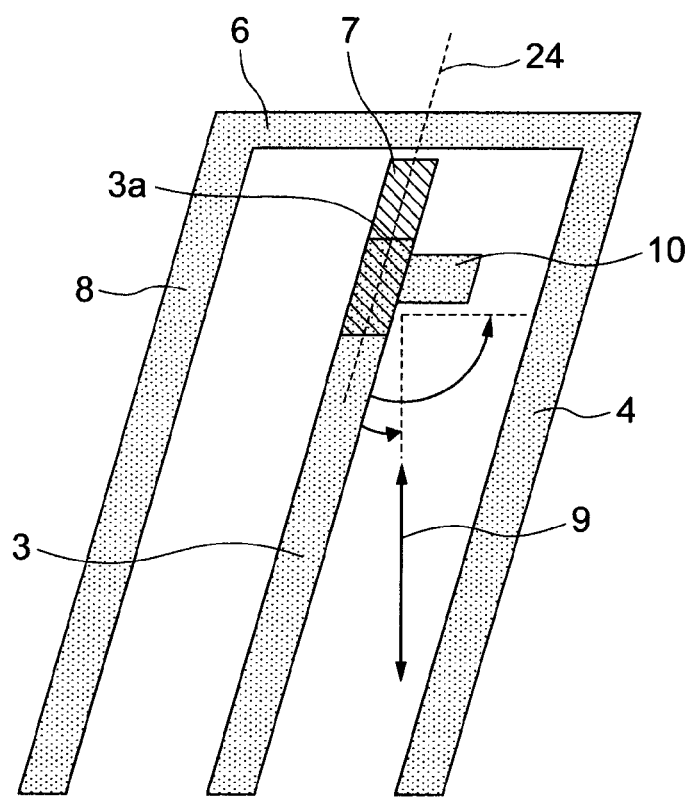
FIG. 11 is an illustration for describing a modification example of the first exemplary embodiment of the present invention.

Further, while the first part 3 of the pixel electrode and the protrusion part 10 of the tip of the pixel electrode are in a shape bent in a zigzag form in the first exemplary embodiment, those parts may be bent in a curved manner as shown in FIG. 10. In that case, there is also no influence for the lock-in effect of the reverser rotation locked region 28.

Further, while the first part 3 of the pixel electrode is not extended up to the position closer to the second part 6 of the common electrode than the protrusion part 10 of the tip of the first part of the pixel electrode in the first exemplary embodiment, it is also possible to employ a structure in which a tip section 3a of the first part 3 of the pixel electrode is slightly pulled out along the reverse rotation locking floating electrode 7.

Furthermore, while the first exemplary embodiment is described by referring to the case where the reverse rotation locked region 28 is locked in by the protrusion part 10 of the tip of the first part of the pixel electrode and the reverse rotation locking floating electrode 7 in the region surrounded on three sides by the first part 3 of the pixel electrode, the first part 4 of the common electrode, and the second part 6 of the common electrode, the same can be implemented in a region of the tip section of the first part of the common electrode that is surrounded on three sides by the pixel electrodes.

Second Exemplary Embodiment

Figure 12:
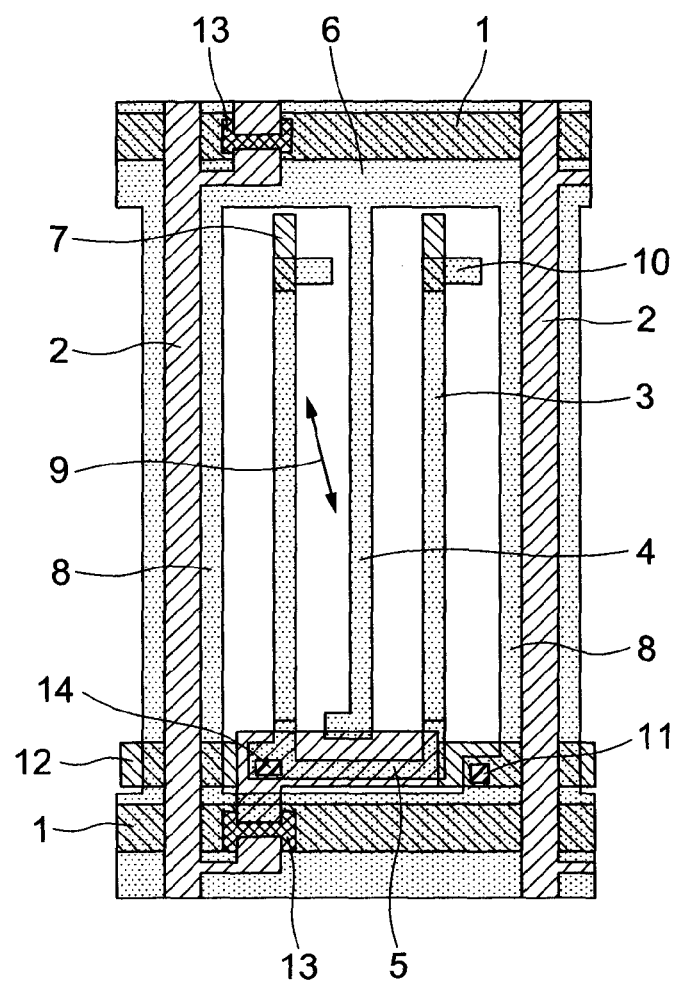
FIG. 12 is a plan view showing the structure of a pixel of a liquid crystal display device according to a second exemplary embodiment of the present invention.
Figure 13:
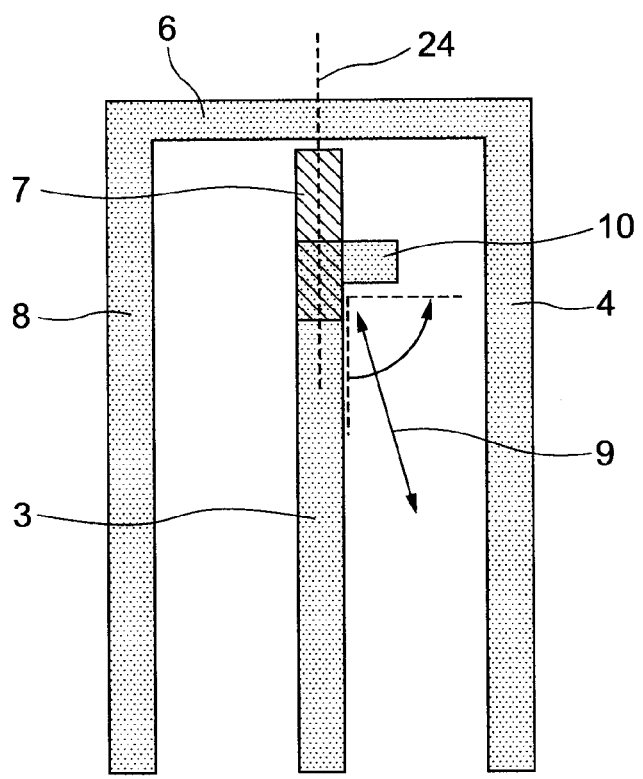
FIG. 13 shows a main part concentrating on the tip section of a pixel electrode shown in FIG. 12 which shows the plan view of the liquid crystal display device according to the second exemplary embodiment of the present invention.
Figure 14:
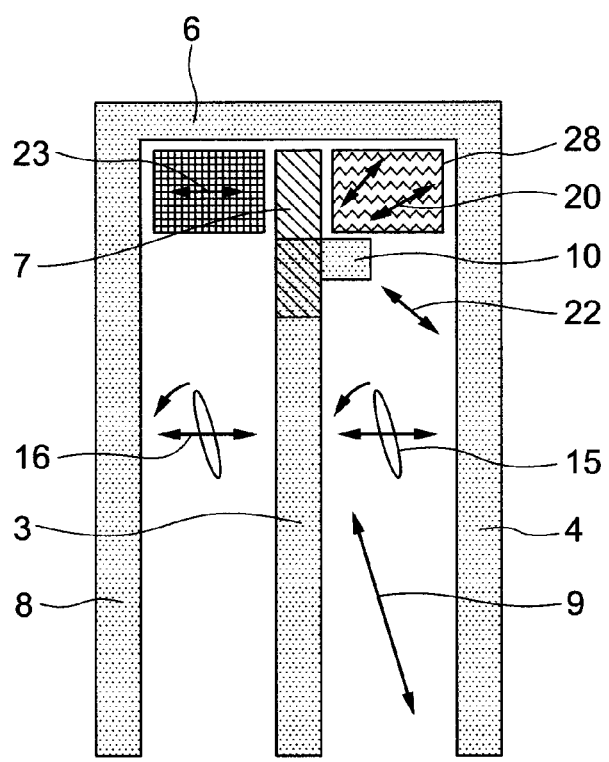
FIG. 14 is an illustration for describing behaviors of the liquid crystal shown in FIG. 13 which shows the main part in the plan view of the liquid crystal display device according to the second exemplary embodiment of the present invention.

A second exemplary embodiment of the present invention will be described by referring to FIGS. 12, 13, and 14. FIG. 12 is a plan view showing the structure of a pixel of a liquid crystal display device according to the second exemplary embodiment of the present invention. FIG. 13 is an enlarged view of the part in the vicinity of the upper end part of a comb-shaped electrode (the first part 3 of the pixel electrode) of the pixel of FIG. 12. FIG. 14 is an illustration for describing behaviors of the liquid crystal shown in FIG. 13.

The pixel according to the second exemplary embodiment of the present invention shown in FIG. 12 is created by the same procedure as that of the first exemplary embodiment. While the first part 3 of the pixel electrode, the first part 4 of the common electrode, and the first part 8 of the common electrode that shields the data line 2 are bent in the center of the pixel in the first exemplary embodiment, the first part 3 of the pixel electrode, the first part 4 of the common electrode, and the first part 8 of the common electrode that shields the data line 2 bent in the center of the pixel are not bent but formed linearly in the second exemplary embodiment.

The liquid crystal initial alignment direction 9 is set to be the direction rotated by 15 degrees counterclockwise from the extending direction of the first part 3 of the pixel electrode, and the liquid crystal molecules are aligned in this direction homogeneously.

The main part regarding the second exemplary embodiment of the present invention will be described by referring to FIG. 13.

On the upper end part of the first part 3 of the pixel electrode, a protrusion part 10 of the tip of the pixel electrode is formed in the direction rotated at angle in a range of 90 degrees, inclusive, to 180 degrees, exclusive, which is in a direction making an acute-angle rotation towards the liquid crystal initial alignment direction 9 from an extending direction of the first part 3 of the pixel electrode by having the end part as the start point (i.e., the direction with which the direction towards the base part from the end part of the first part 3 (the lower direction of the drawing) overlaps with the liquid crystal initial alignment direction 9 by making an acute-angle rotation. In this case, the protrusion part 10 is extended in the same direction as the horizontal direction (the extending direction of the scan line), i.e., extended in the direction of 90 degrees as the rotation angle from the first part 3 of the pixel electrode, in order to acquire the highest light utilization efficiency.

Further, a reverse rotation locking floating electrode 7 extended in the extending direction of the first part 3 of the pixel electrode is formed. The reverse rotation locking floating electrode 7 is formed by a first metal layer, and it is capacitance-coupled with the first part 3 of the pixel electrode via a gate insulating film 101 and a protective insulating film 102.

The reverse rotation locking floating electrode 7 can be brought to the position that is closer to the second part 6 of the common electrode than the terminal part of the first part 3 of the pixel electrode. It is desirable for this reverse rotation locking floating electrode 7 not to overlap with the second part 6 of the common electrode. Thereby, the reverse rotation locking floating electrode 7 has a main capacitance only with the pixel electrode, and only has a small capacitance with the common electrode since it does not overlap with the common electrode. Therefore, it comes to have an almost equivalent potential as that of the pixel electrode. Thereby, as shown in FIG. 14, the reverse rotation floating electrode 7 and the protrusion part 10 of the tip of the pixel electrode come to have the potential of the pixel electrode. The region surrounded by the first part 4 of the common electrode and the second part 6 of the common electrode opposing to that region is an electric field for rotating the liquid crystal in the clockwise direction in the drawing, and this domain can be taken as the reverse rotation locked region 28.

In the meantime, the region corresponding to the lower side of the protrusion part 10 in the drawing on the outside of the border of the reverse rotation locked region 28, a strong electric field 22 works between the protrusion part 10 and the first part 4 of the common electrode. The rotating direction (called a forward direction; counterclockwise direction in this drawing) caused by a desirable electric field 16 between the first part (the comb-shaped electrode part) 3 of the pixel electrode and the first part (the comb-shaped electrode part) 4 of the common electrode and the rotating direction of the liquid crystal caused by the strong electric field 22 match with each other. Therefore, liquid crystal molecules 15 can be rotated in the forward direction in a fine manner in the region on the lower side of the protrusion part 10.

Further, in a part of corresponding to the left side of the drawing of the reverse rotation locking floating electrode 7, the electrode 7 is almost equivalent to the potential of the pixel electrode. Thus, an effective electric field 23 which rotates the liquid crystal molecules 15 in the forward direction can be applied between the first electrode part 8 of the common electrode that shields the data line 2 and the second part 6 of the common electrode efficiently up to the edge of the second part 6 of the common electrode.

The above-structures make it possible to cause almost ideal forward-direction rotations in the regions on the lower side and the left side of the reverse rotation locked region 28 in the drawing, so that the light utilization efficiency can be increased.

Further, it is verified that such phenomena caused with the structures shown in FIGS. 19-21 that a dark region (border domain) generated between the reverse rotation domain and the normal domain becomes large and that the position thereof becomes unstable can be suppressed completely. Thus, it is possible to acquire a structure with which no finger pressing mark or the like is generated at all after releasing an external pressure even when the external pressure such as finger pressing is applied on the display surface, since the reverse rotation locked region is stable.

As described above, with the second exemplary embodiment to which the present invention is applied, the alignment becomes stable and the high light utilization efficiency can be achieved.

Third Exemplary Embodiment

Figure 15:
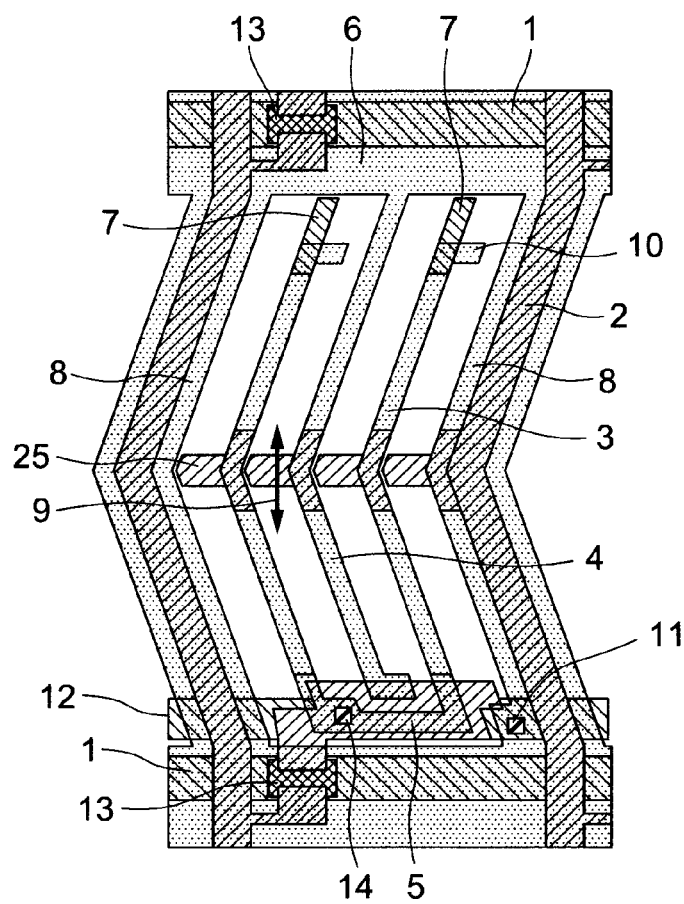
FIG. 15 is a plan view showing the structure of a pixel of a liquid crystal display device according to a third exemplary embodiment of the present invention.

A third exemplary embodiment of the present invention will be described by referring to FIG. 15. FIG. 15 is a plan view showing the structure of a pixel of a liquid crystal display device according to the third exemplary embodiment of the present invention.

The difference of the third exemplary embodiment with respect to the first exemplary embodiment is that a floating domain stabilizing electrode 25 is formed in the bent parts of the first part 3 of the pixel electrode, the first part 4 of the common electrode, and the first part 8 of the common electrode that shields the data line 2 by being overlapped thereon to be capacitance-coupled. Thereby, the state where the rotating directions of the liquid crystal are divided on the upper and lower parts of the pixel electrode is more stabilized, and the reverse rotation locked structure formed in the terminal part of the first part 3 of the pixel electrode can function more stably.

Fourth Exemplary Embodiment

Figure 16:
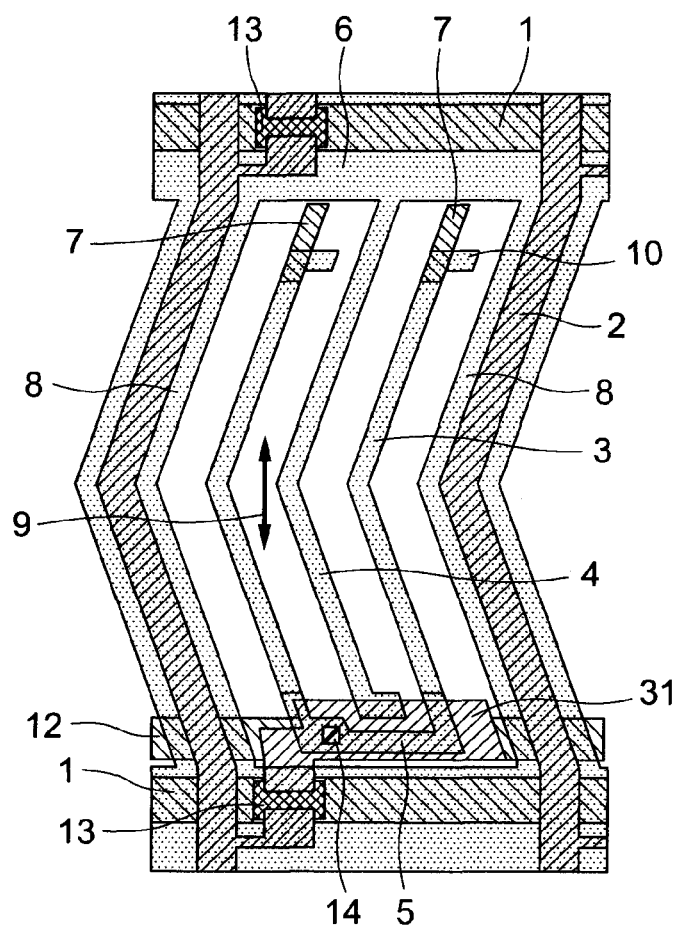
FIG. 16 is a plan view showing the structure of a pixel of a liquid crystal display device according to a fourth exemplary embodiment of the present invention.

A fourth exemplary embodiment of the present invention will be described by referring to FIG. 16. FIG. 16 is a plan view showing the structure of a pixel of a liquid crystal display device according to the fourth exemplary embodiment of the present invention.

The difference of the fourth exemplary embodiment with respect to the first exemplary embodiment is that the through hole 11 for connecting the common electrode is omitted. This makes it possible to form a pixel electrode part 31 formed with a second metal layer still wider and to leave the area required for forming the through hole 11 for the aperture part. Therefore, the light utilization efficiency can be increased further.

Fifth Exemplary Embodiment

Figure 17:
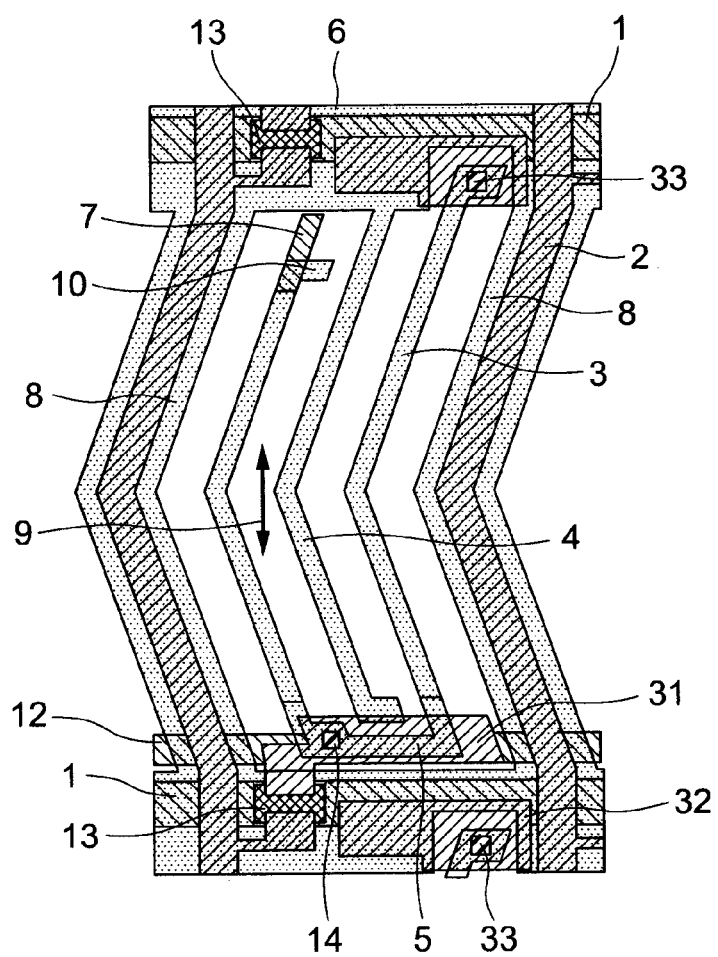
FIG. 17 is a plan view showing the structure of a pixel of a liquid crystal display device according to a fifth exemplary embodiment of the present invention.

A fifth exemplary embodiment of the present invention will be described by referring to FIG. 17. FIG. 17 is a plan view showing the structure of a pixel of a liquid crystal display device according to the fifth exemplary embodiment of the present invention.

The difference of the fifth exemplary embodiment with respect to the fourth exemplary embodiment is as follows. That is, the fifth exemplary embodiment is structured to: form a gate storage forming pixel electrode part 32 formed with a second metal layer to overlap with a scan line that is not the one which performs switching out of two scan lines 1 neighboring to the pixel; and form a second through hole 33 connecting the pixel electrode to connect a pixel electrode part 31 formed with the second metal layer via the first part 3 of the pixel electrode. Further, for forming the connection part, the second part 6 of the common electrode is formed not to cover the scan line 1 entirely but to dig out the second through hole 33 for connecting the pixel electrode and the ITO pixel electrode part for connecting it.

A storage capacitance (gate storage) is formed between the gate storage forming pixel electrode part 32 formed with the second metal layer and the scan line 1 via a gate insulating film. Further, a capacitance is formed also between the gate storage forming pixel electrode part 32 formed with the second metal layer and the second part 6 of the common electrode formed thereon. This makes it possible to reduce the storage capacitance formed between the pixel electrode part 31 formed with the second metal layer and a common signal wiring 12, so that the area of that part can be decreased. Therefore, the area of the display region can be widened further.

Sixth Exemplary Embodiment

Figure 18:
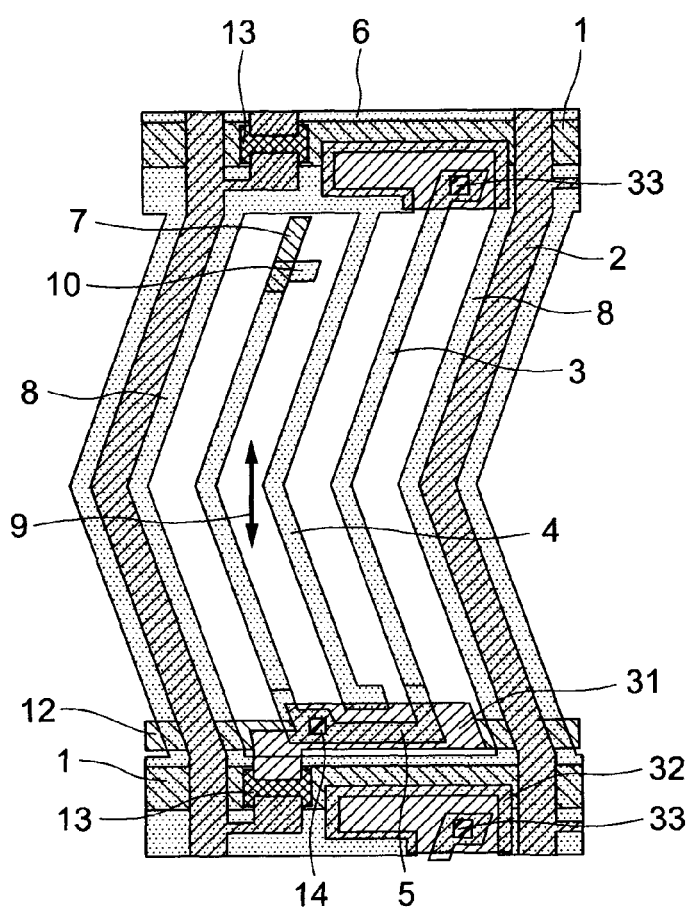
FIG. 18 is a plan view showing the structure of a pixel of a liquid crystal display device according to a sixth exemplary embodiment of the present invention.

A sixth exemplary embodiment of the present invention will be described by referring to FIG. 18. FIG. 18 is a plan view showing the structure of a pixel of a liquid crystal display device according to the sixth exemplary embodiment of the present invention.

The difference of the sixth exemplary embodiment with respect to the fifth exemplary embodiment is that the second part 6 of the common electrode is formed by further digging out the pattern so that the part overlapped with the gate storage forming pixel electrode part 32 formed with the second metal layer becomes decreased as much as possible.

In a case where a contact hole electrode is not formed within the pixel as in the cases of the fifth and sixth exemplary embodiments, it is necessary to supply the common electrode potential of ITO of each pixel only with a network connected in matrix formed with the ITO electrodes within the pixels from the bus lines of the common electrodes that are formed in four sides of the display device, such as a wiring lead part or the like on the outside of a display unit. In general, the ITO electrode exhibits a higher resistance compared to wiring metal or the like such as Cr used for the first and second metal layers. Thus, there is a possibility that the common electrode potential of ITO does not reach a prescribed common electrode potential after writing is completed, due to delay caused by coupling with the data line, etc.

In this case, it is found as a result of studies that there is a following relation between a deviation $\Delta Vf$ of the ITO common electrode potential from the prescribed common electrode potential at the point where writing of the pixel ends and a deviation $\Delta Veff$ from an ideal effective voltage when there is no delay in the time average of the effective voltage between the pixel electrode and the common electrode within one frame from the end of writing, provided that a capacitance formed between the pixel electrode and the ITO common electrode within a pixel is $C1$, and the sum of the capacitance between the pixel electrode and the scan line 1 and the capacitance between the pixel electrode and the common signal wiring 12 is $C2$.

$$\Delta Veff = \Delta Vf \cdot C1/(C1+C2)$$

As a result of several studies, it is found that the influence of delay of ITO becomes a level that has almost no problem in terms of display when $C1/(C1+C2) < 1/5$ is satisfied, and becomes a level that has almost no problem in practical use when $C1/(C1+C2) < 1/3$ is satisfied.

Keeping the above-described facts in mind, the difference of the sixth exemplary embodiment with respect to the fifth exemplary embodiment is that the pattern is dug out further so that the overlapping part of the second part 6 of the common electrode and the gate storage forming pixel electrode part 32 formed with the second metal layer is decreased as much as possible, and that it is defined as $C1/(C1+C2) = 1/4$.

This makes it possible to suppress the influence of the delay caused due to the resistance of ITO to a level that has almost no problem in practical use.

It is to be noted that the present invention is not limited only to the depictions of the above exemplary embodiments. It is possible to apply modifications and changes to the structures, layout, shapes, and the like as appropriate as long as the protrusion part bent to the extending direction of the comb-shaped electrode and the reverse rotation locking floating electrode extending along the extending direction of the comb-shaped electrode are provided in the tip section of the comb-shaped electrode.

The whole or part of the exemplary embodiments disclosed above can be described as, but not limited to, the following supplementary notes:

(Supplementary Note 1)

A lateral-electric-field mode liquid crystal display device which enables display by rotating homogeneously aligned liquid crystal by a lateral electric field that is substantially in parallel to a substrate applied between pixel electrodes and common electrodes, wherein: the pixel electrodes and the common electrodes are formed on a same layer, and the pixel electrodes and the common electrodes have comb-shaped first parts extended alternately substantially in parallel to each other; there is at least one region in a terminal end part of the first part of either the pixel electrode or the common electrode, which is surrounded on three sides by two of the first parts of the other electrode out of the pixel electrode and the common electrode and a second part that connects the two first parts; and at least in the one region, there is a protrusion part connected to the terminal part of the first part, the protrusion part being extended in a direction rotated by an angle in a range of 90 degrees, inclusive, to 180 degrees, exclusive, by having the terminal part of the first part as the rotation center, towards a direction, by an acute angle rotation towards which direction, the extending direction of the first part can be overlapped with an alignment direction of the liquid crystal, and there is also a floating electrode that overlaps with the terminal part of the first part via an insulating film, the floating electrode being extended in a direction that is roughly the same direction as the extending direction of the first part up to a position closer to the second part of the other electrode than the terminal part of the first part.

(Supplementary Note 2)

The liquid crystal display device as depicted in Supplementary Note 1, wherein: the first parts of the pixel electrode and the common electrode are in a bent structure which includes a part tilted by a specific angle θ with respect to the liquid crystal alignment direction and a part tilted by −θ; and the second part of the pixel electrode or the common electrode is extended along a direction that is substantially orthogonal to the liquid crystal alignment direction.

(Supplementary Note 3)

The liquid crystal display device as depicted in Supplementary Note 1 or 2, wherein the extending direction of the protrusion part is substantially in parallel to the second part of the other electrode.

(Supplementary Note 4)

The liquid crystal display device as depicted in any one of Supplementary Notes 1 to 3, wherein the floating electrode is formed to overlap with at least a part of the terminal part of the first part and the protrusion part.

(Supplementary Note 5)

The liquid crystal display device as depicted in Supplementary Note 4, wherein the floating electrode is extended up to a position closer to the first part of the other electrode than the protrusion part.

INDUSTRIAL APPLICABILITY

The present invention can be utilized for lateral-electric-field mode active matrix liquid crystal display devices and arbitrary apparatuses which use the liquid crystal devices as the display devices.

What is claimed is:

1. A lateral-electric-field mode liquid crystal display device which enables display by rotating a homogeneously aligned liquid crystal by a lateral electric field that is substantially in parallel to a substrate applied between pixel electrodes and common electrodes, the liquid crystal display device comprising:
    a plurality of the pixel electrodes and a plurality of the common electrodes formed on a same layer and having comb-shaped parts extended alternately substantially in parallel to each other,
    wherein one of the plurality of the common electrodes is formed in a comb shape, the one common electrode comprising:
        first parts extended in parallel,
        a second part configured to connect the first parts, and
        a shielding part configured to shield a data line,
    one of the plurality of the pixel electrodes is provided in the comb-shaped common electrode substantially in parallel to the first parts,
    the first parts and the shielding part of the common electrode and a first part of the pixel electrode are tilted with respect to a liquid crystal initial alignment direction,
    the pixel electrode comprises:
        a floating electrode which has a substantially equal potential as the pixel electrode, overlaps with the first part of the pixel electrode via an insulating film, and extends toward a position close to the second part of the common electrode, and
        a protruded part which has a substantially equal potential as the pixel electrode and extends only toward one of the first parts of the common electrode,
    a reverse rotation locked region where homogeneously-aligned liquid crystals are locked is formed by being surrounded by the floating electrode, the protruded part, one of the first parts of the common electrode, and the second part of the common electrode,
    a rotating direction of liquid crystal molecules of the liquid crystal caused by a first electric field which works between the protruded part and the one of the first parts of the common electrode, and the lateral electric field which works between the first part of the pixel electrode and the first part of the common electrode in a region on an outside of a border of the reverse rotation locked region and the protruded part, are matched with each other, and
    an effective electric field which rotates the liquid crystal molecules in a forward direction is applied between the shielding part of the common electrode and the second part of the common electrode up to an edge of the second part of the common electrode.

2. The liquid crystal display device as claimed in claim 1, wherein:
    the one pixel electrode and the one common electrode form a comb-shaped electrode that has a bent structure which includes a part tilted by a specific angle θ with respect to the liquid crystal alignment direction and a part tilted by −θ.

3. The liquid crystal display device as claimed in claim 2, wherein the specific angle θ is 15 degrees.

4. The liquid crystal display device as claimed in claim 1, wherein an extending direction of the protruded part is along a scan line of the liquid crystal display device.

5. The liquid crystal display device as claimed in claim 1, wherein the protruded part is extended to be at least 2 μm from a tip of the first part of the pixel electrode.

* * * * *